(12) United States Patent
Donlan

(10) Patent No.: US 9,910,603 B1
(45) Date of Patent: Mar. 6, 2018

(54) HETEROGENEOUS DATA STORAGE ON MAGNETIC TAPE

(71) Applicant: Amazon Technologies, Inc., Seattle, WA (US)

(72) Inventor: Bryan James Donlan, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/938,748

(22) Filed: Nov. 11, 2015

(51) Int. Cl.
*G06F 12/00* (2006.01)
*G06F 13/00* (2006.01)
*G06F 13/28* (2006.01)
*G06F 3/06* (2006.01)

(52) U.S. Cl.
CPC .......... *G06F 3/0611* (2013.01); *G06F 3/0644* (2013.01); *G06F 3/0682* (2013.01)

(58) Field of Classification Search
CPC ..... G06F 3/0611; G06F 3/0644; G06F 3/0682
USPC ......................................................... 711/111
See application file for complete search history.

(56) References Cited

U.S. PATENT DOCUMENTS

| | | | | |
|---|---|---|---|---|
| 5,303,095 A * | 4/1994 | Vuong | ................... | G06F 3/0601 360/46 |
| 5,412,780 A * | 5/1995 | Rushton | ................ | G06F 3/0601 711/113 |
| 5,477,399 A * | 12/1995 | Honjo | ................... | G11B 15/43 242/334.6 |
| 5,485,321 A * | 1/1996 | Leonhardt | ............. | G06F 3/0601 360/48 |
| 5,568,650 A * | 10/1996 | Mori | .................... | G06F 3/0601 710/52 |
| 5,742,444 A * | 4/1998 | Ozue | .................. | G11B 15/4673 360/60 |
| 6,067,481 A * | 5/2000 | Saliba | .................. | G06F 3/0608 360/73.08 |
| 6,345,017 B1 * | 2/2002 | Inoue | .................... | G11B 19/02 369/30.24 |
| 6,385,736 B1 * | 5/2002 | Jeong | ................. | G11B 20/1883 714/48 |
| 6,557,074 B1 * | 4/2003 | Michel | ................. | G06F 3/0601 711/112 |
| 6,603,626 B1 * | 8/2003 | Takayama | .......... | G11B 15/1875 360/73.04 |
| 6,614,616 B1 * | 9/2003 | Michel | ................ | G11B 5/5547 360/78.04 |
| 8,493,823 B1 * | 7/2013 | Edling | .................... | G11B 7/14 369/44.18 |

(Continued)

*Primary Examiner* — Sheng-Jen Tsai
(74) *Attorney, Agent, or Firm* — Davis Wright Tremaine LLP

(57) ABSTRACT

Techniques for storing data on a tape using a heterogeneous data storage technique are described herein. A logical partition from a logical model of a data storage tape is associated with a set of data. If a current location of the data storage tape corresponds to the logical partition of the set of data, a first data transfer operation associated with the set of data is performed using the data storage tape. The data transfer operation is monitored and changes to the data transfer rate of the data transfer operation are used to update the logical extent of the tape and to update the logical model. If the current location of the data storage tape does not correspond to the logical partition of the set of data, the data set is staged for later storage.

20 Claims, 9 Drawing Sheets

(56) References Cited

U.S. PATENT DOCUMENTS

| | | | |
|---|---|---|---|
| 2004/0008444 A1* | 1/2004 | Yoshihiro | G11B 20/12 360/73.07 |
| 2005/0044470 A1* | 2/2005 | Seger | G11B 20/1879 714/770 |
| 2005/0226594 A1* | 10/2005 | Suzuki | H04N 19/152 386/328 |
| 2006/0164744 A1* | 7/2006 | Greco | G11B 5/00817 360/55 |
| 2007/0206308 A1* | 9/2007 | Bates | G11B 23/042 360/55 |
| 2008/0253017 A1* | 10/2008 | Kitahara | G11B 15/43 360/75 |
| 2010/0161624 A1* | 6/2010 | Inada | G06F 17/5009 707/754 |
| 2011/0116185 A1* | 5/2011 | Katagiri | G11B 15/1875 360/73.04 |
| 2011/0225186 A1* | 9/2011 | Li | G11B 27/105 707/769 |
| 2012/0254264 A1* | 10/2012 | Barbian | G06F 3/06 707/812 |
| 2013/0044386 A1* | 2/2013 | Sato | G11B 23/042 360/15 |
| 2013/0279041 A1* | 10/2013 | Holmberg | G11B 5/00813 360/75 |

* cited by examiner

HETEROGENEOUS DATA STORAGE ON MAGNETIC TAPE

BACKGROUND

Modern computer systems typically use a mix of short-term and long-term storage systems. Data that is needed for current operations may be stored in short-term storage such as, for example, computer memory or disk drives. Data that is not needed for current operations such as, for example, archival or backup data, is typically stored in long-term storage on magnetic tapes. Access to data on magnetic tapes can be very slow, not only because the magnetic tape must be physically placed in the tape drive before it can be accessed, but also because a magnetic tape is typically organized in a sequential manner. Because of this, one of the largest factors for accessing data on a mounted magnetic tape is seeking to the proper read position. Data stored on a magnetic tape may be written as it is received. In the case of a computer system that is streaming data to tape from multiple sources such as occurs when the magnetic tape storage is used in a distributed computer system, a single data set may be stored across multiple locations on the magnetic tape. The more distributed a set of data is on a magnetic tape, the more seek time is required, leading to slower speeds of access to the data.

BRIEF DESCRIPTION OF THE DRAWINGS

Various techniques will be described with reference to the drawings, in which.

DETAILED DESCRIPTION

Figure 1:
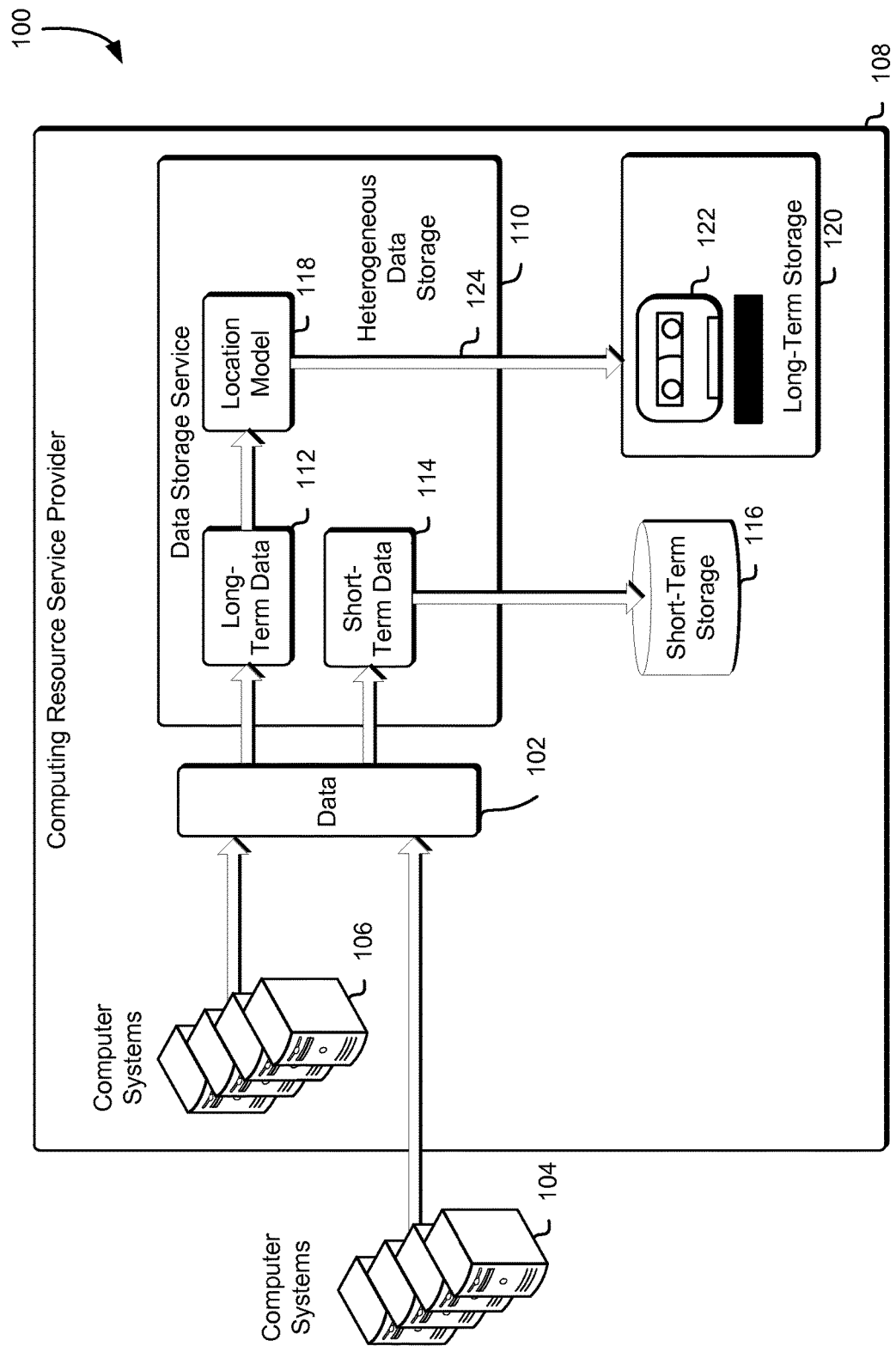
FIG. 1 illustrates an example environment where data is stored on magnetic tape using a heterogeneous data storage technique.

This disclosure relates to heterogeneous data storage on sequential storage media such as magnetic tapes. Data generated by computer systems may be stored in both short-term and long-term storage, depending on when and how the data needs to be accessed. When data is stored in long-term storage, comparatively inexpensive data storage media such as magnetic tapes may be used. Using the comparatively inexpensive magnetic tape in lieu of more expensive storage operations such as, for example, magnetic or optical disk drives incurs a penalty of slower access to the data. For example, a data set stored on a disk drive is generally immediately accessible to an application or process running on a computer system. By contrast, data stored on a magnetic tape can take a considerable amount of time to access.

Accessing data on a magnetic tape requires first physically locating the magnetic tape (also referred to herein simply as a "tape"). Typically, data is stored on a magnetic tape and the contents of the tape (i.e., a catalog of the contents of the tape) may be recorded in a database. The tape itself is then removed from the tape drive and placed in an archival location such as a tape vault. When the data on the tape is needed, the tape must be located based on the tape database, physically removed from the tape vault, brought to a magnetic tape drive, and inserted into the magnetic tape drive, or mounted. The process of locating and mounting the tape may be automatically performed by, for example, a robotic tape system or may be performed manually by, for example, tape warehouse personnel, or may be performed by a combination of automatic and manual systems.

After the tape is mounted, the drive reads the tape to enable the computer system operating the drive to locate the data on the tape. The location of a particular set of data on a tape is generally determined when the data is written and stored in a data catalog, which may be stored on the tape and/or in a separate location (e.g., in an external database). Once the location of the particular set of data is known, the tape is spooled to the location in a "seek" operation and only then can the data be read. When the data is stored in a manner that has it distributed across multiple locations on the tape as described below, multiple seek operations must be performed to read the entire data set. When reading data from a tape, multiple seek operations can cause large slowdowns in the rate at which data can be read from the tape. Each time the tape must seek to a new location, several seconds of delay can result. With data spread across a tape in multiple locations that may be physically separated by many meters of tape, it can require tens or even hundreds of times longer to read the data.

The techniques described in this disclosure can reduce the amount of seek time, and thus increase the speed at which the data can be retrieved from the tape by organizing the data on the tape in a heterogeneous manner. Although the organization of data on a tape is described in more detail below, typically a tape is most efficient if it can spool from one end to the other of the tape, not stopping to seek different locations, and then when the end is reached, the tape head (i.e., the read-write head) is advanced to the next track and the tape can then spool back. The tape head, which may also be referred to herein as a "magnetic tape head" or a "data storage tape head" is a component of the tape drive upon which the magnetic tape is mounted. For example, if a tape is mounted (i.e., inserted into) a particular tape drive, as used herein, the tape head corresponding to that tape will be a tape head (which may be one of a plurality of tape heads) of that tape drive. When either reading or writing, spooling the tape from the beginning, to the end, back to the beginning, and so on means that the tape can be reading and/or writing at the most efficient rate. Using the techniques described in this disclosure to organize the data when it is written to the tape, the tape can be written in this highly efficient manner and read back in a manner that is considerably more efficient than if the data is not so organized.

Data may be stored on a tape heterogeneously by first logically partitioning the tape across the length of the tape and then writing all data from the same data set in the same partition. For example, a linear tape open, generation six ("LTO-6") tape is 846 meters long. Such a tape could be logically partitioned into, for example, sixteen partitions with each partition being approximately fifty-two meters long. It should be noted that this logical partitioning does not require formatting or writing partition data to the tape but is instead a logical model for the tape. Each logical partition (also referred to herein more simply as a "partition") is a representation of a model of the tape rather than a physical partitioning of the tape. A plurality of logical partitions of the tape is generated such that each partition of the plurality specifies a corresponding portion of the logical extent of the tape (also referred to herein more simply as the "extent" of the tape) and each partition of the plurality is disjoint from the other partitions (i.e., the partitions do not overlap and each location corresponds to at most, one partition).

As used herein, the extent of the tape refers to the logical extent of the tape rather than, for example, the physical extent (e.g., the length) of the tape. Accordingly, the logical extent of a tape may refer to the length of the tape, but may also refer to the amount of data that can be written to the tape (e.g., the tape capacity), or the amount of time that it takes to write such data to the tape. For example, the logical extent of a tape, from one end to the other, may be described in terms of the number of megabytes that may be stored on the tape in a single pass (e.g., from BOT to EOT or from EOT to BOT). The amount of data that may be stored on the tape in a single pass (also referred to herein as the amount of data that may be stored on the tape "per pass") is based at least in part on the logical extent of the tape and may be measured in data transmitted (e.g., megabytes), time (e.g., seconds), or length (e.g., meters) as described herein. It should be noted that, while the examples described herein discuss the logical extent of the tape in terms of the amount of data that can be written to the tape, other logical extents of the tape including, but not limited to, the time it takes to spool the tape from BOT to EOT (or from EOT to BOT) or the length of the tape may be considered within the scope of the present disclosure.

In an embodiment, less than the plurality of partitions may be sufficient to cover the logical extent of the tape. In the example above, the first fifty-two meters of the tape are represented by the first partition, the second fifty-two meters are represented as the second partition, and so on. However, because these are logical partitions, there may not be a corresponding physical partition of the tape. However, in the embodiment described, the first 104 meters may be represented by the first partition, the second 104 meters may be represented by the second partition, and so on.

Data may then be stored on this tape heterogeneously by limiting the storage of any data set to a particular partition or set of partitions. For example, a data set may be received for storage on the tape and it may be determined that the data will be stored in the first partition. As the tape is spooling under the read-write head from, for example, the beginning of the tape ("BOT") to the end of the tape ("EOT"), as long as the tape is utilizing the first partition, the data can be written. When the tape head moves beyond the first partition, some other data set will be written to the tape. Then, when the tape is spooling under the read-write head from the EOT to the BOT, and the tape is utilizing the first partition again, more of the data can be written. This process can continue until the data set is completely written.

Data stored in such a matter can be read back from the tape with fewer seeks because once the tape is spooled to the correct partition, a seek will only have to seek within that partition (i.e., will seek within fifty-two meters of tape partition rather than within 846 meters of tape). Because seek time is based on the distance between the start position and the location of the data, seek times within a partition are considerably shorter than seek times within a whole tape.

It is important for the logical partitioning of the tape to be based on an understanding of where the ends of the tape are so that an accurate model for the partitions can be generated. In the example described above, each partition is one-sixteenth of the way from the BOT to the EOT. So if 128 megabytes of data are written to the tape when the tape is spooled from the BOT to the EOT, then each partition of the sixteen partitions would be about eight megabytes long. Some tapes and tape drives are configured to determine and report the tape position at any time by, for example, querying hardware, firmware, and/or software associated with the tape drive. The position query (i.e., the query to the hardware, firmware, and/or software associated with the tape drive) may result in an accurate position of the tape position, or a delayed position of the tape drive, or an estimated position of the tape drive.

In such tapes, a logical partitioning of the tape may be very accurate because of the accurate position data or may merely be an estimate because of delays and uncertainties in reporting the position data. Other tapes and tape drives are not so configured. However, an accurate model for the partitions can still be generated by heuristically determining the ends of the tape based on data rates. When a tape reaches the EOT (or the BOT), the tape speed slows down and stops prior to reversing direction. During this slowdown and reversal (referred to herein as a "wrap"), the data transfer rate drops significantly. The slowdown of the data transfer rate may be detected by monitoring a data transfer rate to detect slowdowns. Slowdowns may be detected by monitoring the data transfer rate at a high frequency and detecting fluctuations in the data transfer rate, or by periodically monitoring the data transfer rate at a lower frequency and building a statistical model for the data transfer rate, or using some other monitoring technique. Therefore, for a particular type of tape and/or a particular tape drive, the time between the wraps can be used to determine the logical partitions to within an acceptable error rate.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where data is stored on magnetic tape using a heterogeneous data storage technique in accordance with an embodiment. Data 102 may be received from one or more computer systems for storage using a data storage service 110 associated with a computing resource service provider 108. The data 102 may be received from one or more computer systems 104 outside of the environment provided by the computing resource service provider 108. For example, customers of the computing resource service provider 108 may generate data on computer systems hosted within a customer data center and the customers may provide that data to the computing resource service provider 108 for storage.

The data 102 may also be received from one or more computer systems 106 inside of the environment provided by the computing resource service provider 108. For example, computer systems that host services provided by the computing resource service provider 108 may generate data associated with those services that also may be provided to the computing resource service provider 108 for storage.

The data 102 may be data that should be stored so that the data is quickly accessible. Such short-term data 114 may be stored in short-term storage 116 by the data storage service 110 using, for example, magnetic disk drives. Such short-term data 114 may be later moved to long-term storage using the techniques described herein.

Conversely, the data 102 may be data that does not need to be stored so that the data is quickly accessible. Such long-term data 112 may be stored in long-term storage 120 by the data storage service 110 using, in the example illustrated in FIG. 1, a magnetic tape system 122 with one or more magnetic tape drives and one or more magnetic tapes. In the example illustrated in FIG. 1, the data storage service 110 uses a location model 118 (described below) to determine a heterogeneous data storage 124 technique for the storage of the long-term data 112.

In an embodiment, the magnetic tape system 122 is a plurality of magnetic tape drives provided by the computing resource service provider 108, a plurality of magnetic tapes, a magnetic tape archive, and a database of the contents of each of the magnetic tapes. As a tape is written, an entry in the database is updated so that a particular tape can be located based at least in part on the data on the tape. When the tape is full, or it is determined that no more data should be stored on the tape, the tape is removed from the tape drive and put into the tape archive. At a later time, when the data stored on the tape is needed, the tape is located in the tape archive using the entry in the tape database, the tape is placed back in the tape drive, and the data is read.

The heterogeneous data storage 124 for the tape is based at least in part on the location model 118. The location model 118 is a model of the tape, based on a determination of the length of the tape, so that a logical partitioning of the tape may be generated and used for the heterogeneous data storage 124. Each tape may have a plurality of logical partitions with each logical partition representing a linear section of tape. For example, as described above, if a LTO-6 tape is 846 meters long and it is logically partitioned into sixteen partitions, then each partition is approximately fifty-two meters long. In such an example, the first logical partition is the first fifty-two meters of tape, the second logical partition is the second fifty-two meters of tape, and so on.

In an embodiment, the location model is based on determining the BOT and the EOT from the tape wraps. As the tape reaches the BOT or the EOT, the data transfer rate to the tape may slow down as the tape slows down and reverses direction. Such changes in the data transfer rate may be used to generate a model for the tape based on the type of tape and the tape drive and, using a linear approximation, to generate a location model. Consider the example described above, where there should be sixteen logical partitions of the tape. If, based upon data transmission slowdowns, it is determined that the wraps occur after every 128 megabytes of data has been written to the tape, then a location model for the partitions can be generated. In this example, the first eight megabytes of data transfer after a wrap at the BOT are the first partition, the second eight megabytes of data transfer after a wrap at the BOT are the second partition, and so on. Similarly, the second to last eight megabytes of data transfer after the wrap at the EOT are the second partition because the tape is moving in the direction from the EOT to the BOT and the last eight megabytes of data transfer after the wrap at the EOT are the first partition, again because the tape is moving in that same direction.

In another embodiment, the tape drive may be configured to report the tape position in, for example, meters. In such an embodiment, the BOT, the EOT, and each of the partitions can be accurately determined. Again, using the example above, the first fifty-two meters (approximately) is the first partition when the tape is moving from the BOT to the EOT while the last fifty-two meters is the first partition when the tape is moving from the EOT to the BOT. In the diagrams illustrated below, further details on how the data is written and read are presented.

Figure 2:
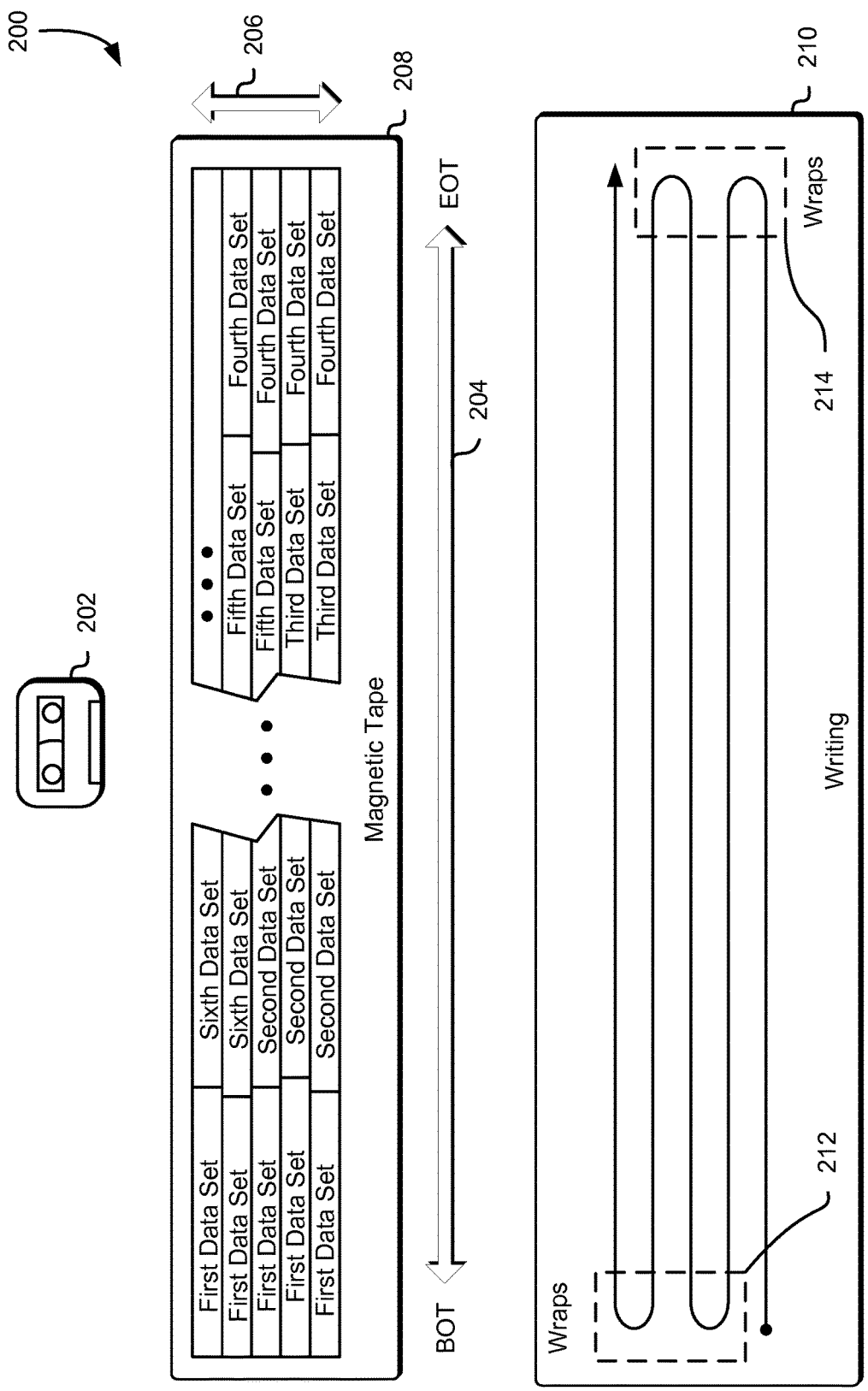
FIG. 2 illustrates an example diagram of how data is written to magnetic tape using a heterogeneous data storage technique.

FIG. 2 illustrates an example diagram 200 of how data is written to magnetic tape using a heterogeneous data storage technique in accordance with an embodiment. In the example illustrated in FIG. 2, a heterogeneous data storage technique for storing data on a magnetic tape 202 is shown. The magnetic tape 208 spools 204 in both directions (i.e., from BOT to EOT and from EOT to BOT) and the read-write heads move 206 up and down (i.e., perpendicularly to the spooling of the tape) to access the several tracks of the tape. It should be noted that while the example illustrated in FIG. 2 shows five simple tracks, a tape typically has many more tracks. For example, a LTO-6 tape has over 2000 tracks. The simplified version is shown here for illustrative purposes.

In the example illustrated in FIG. 2, there are six different data sets being written to the tape in four different partitions and each track of each partition is configured to store 100 megabytes ("MB") of data based on the location model. In the example illustrated, the first data set is less than 500 MB, the second data set is less than 300 MB, the third data set is less than 200 MB, the fourth data set is less than 400 MB, the fifth data set is less than 200 MB, and the sixth data set is less than 200 MB.

As the magnetic tape spools 204 from the BOT to the EOT, the first 100 MB of the first data set is written, followed by the first 100 MB of the second data set, followed by the first 100 MB of the third data set, followed by the first 100 MB of the fourth data set. After the wrap, when the tape spools from the EOT to the BOT, the second 100 MB of the fourth data set is written, followed by the second 100 MB of the third data set, followed by the second 100 MB of the second data set, followed by the second 100 MB of the first data set.

Using this heterogeneous data storage technique, the first 200 MB of each data set are located in the same partition and are, consequentially, located within the same section of the tape. Continuing the write, on the next pass when the tape spools 204 from the BOT to the EOT again, the third 100 MB of the first data set and the third 100 MB of the second data set are written. Because the third data set is less than 200 MB, the first 100 MB of the fifth data set can then be written, followed by the third 100 MB of the fourth data set. On the fourth pass, the sixth data set can be added in the second partition and so on.

As described above, the heterogeneous data storage may require a location model for the tape so that the location of the start and end of each partition can be determined. It should be noted that the heterogeneous data storage technique described herein does not require an extremely accurate location model (i.e., does not require exact positions for the partitions). Using the techniques described herein, a heuristic location model can be used to determine approximate locations for the partitions.

In the example illustrated in FIG. 2, wraps 212 at the BOT and wraps 214 at the EOT are used to determine the logical length of the tape while writing 210 the data. The wraps can be determined using a plurality of tape drives and/or a plurality of tapes as described below so that, for each combination of tape drive and tape type, a location model can be generated. The logical length of the tape can be measured in an amount of data (e.g., bytes written), a length of time (e.g., seconds), or a length (e.g., meters or feet). Each of these metrics can be derived from the others. For example, if a tape spools at 10 meters-per-second, and it takes 80 seconds to spool the tape from BOT to EOT, then the tape is 800 meters long. Similarly, if a tape stores data at 150 megabytes ("MB") per second and it takes 80 seconds to write the tape from BOT to EOT, then the extent of the tape would be approximately 12 gigabytes ("GB") per pass. As may be contemplated, the numbers used herein for the extent of a tape are merely illustrative examples, and other values for the size, length, and/or the extent of a tape may be considered as within the scope of the present disclosure.

Using these values, and assuming sixteen logical partitions, then each logical partition would be fifty meters long (e.g., if measured as length), or five seconds long (e.g., if measured as a time interval), or seven-and-a-half GB long (e.g., if measured as an amount of data). As may be contemplated, the examples of tape length, number of tracks, number of logical partitions, size of logical partitions, and type of logical partitions described herein are illustrative examples and other such tape lengths, numbers of tracks, numbers of logical partitions, sizes of logical partitions, and types of logical partitions may be considered as within the scope of the present disclosure.

Figure 3:
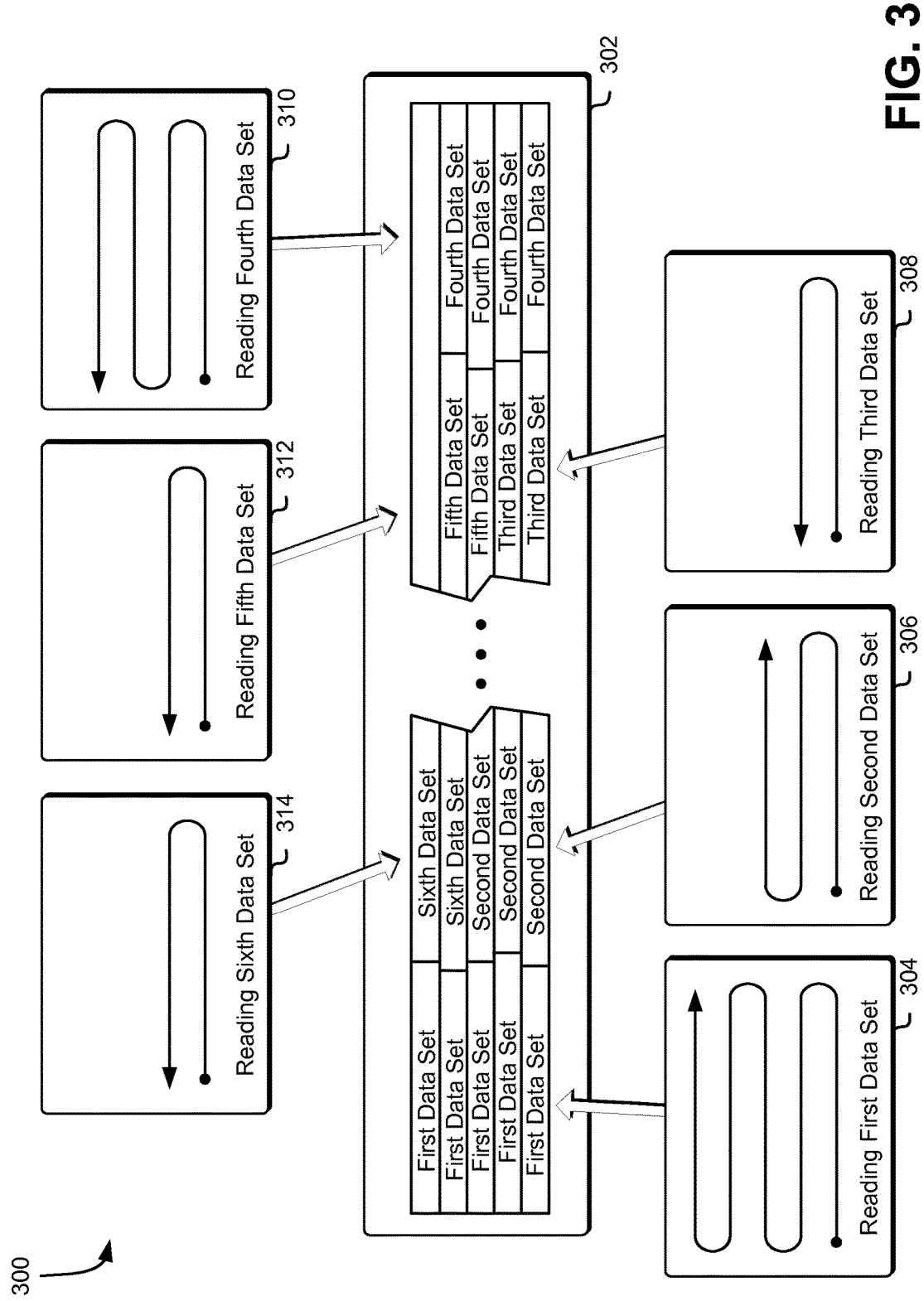
FIG. 3 illustrates an example diagram of how data is read from magnetic tape when stored using a heterogeneous data storage technique.

FIG. 3 illustrates an example diagram 300 of how data is read from magnetic tape that uses a heterogeneous data storage technique as described in connection with FIG. 1 and in accordance with an embodiment. In the example illustrated in FIG. 3, the data is written 302 as described in connection with FIG. 2, with the first data set stored on five tracks in the first partition, the second data set stored on three tracks of the second partition, the third data set stored on two tracks of the third partition, the fourth data set stored on four tracks of the fourth partition, the fifth data set stored on two tracks of the third partition, and the sixth data set stored on two tracks of the second partition.

When reading data in the first data set 304, any seek to find different sub-parts of the data in the first data set may be limited to seeking within the first partition. When reading data in the second data set 306, any seek to find different sub-parts of the data in the second data set may be limited to seeking within the second partition. Similarly, when reading data in the sixth data set 314, any seek to find different sub-parts of the data in the sixth data set may also be limited to seeking within the second partition. It should be noted that, because the second data set and the sixth data set are within the same partition, reads from these data sets may be efficiently performed at the same time.

When reading data in the third data set 308 or the fifth data set 312, any seek to find different sub-parts of the data may be limited to seeking within the third partition and when reading data in the fourth data set 310, any seek may be limited to seeking within that partition. Just as with the second and sixth data sets, reads from the third and fifth data sets may be efficiently performed at the same time. It should be noted that, while in the example illustrated in FIG. 3, the starting points of the data reads, the ending points of the data reads, and the associated wraps of the data reads for a data set (e.g., the first data set 304) appear to be well aligned, this alignment is for illustrative purposes only. In practice, a read operation may result in one or more seek operations to locate the location of the start of the data. Additionally, as described below, the start of a data set for a particular pass, the end of a data set for a particular pass, and consequentially, the wraps for a data set may not perfectly conform to this illustrated alignment.

Figure 4:
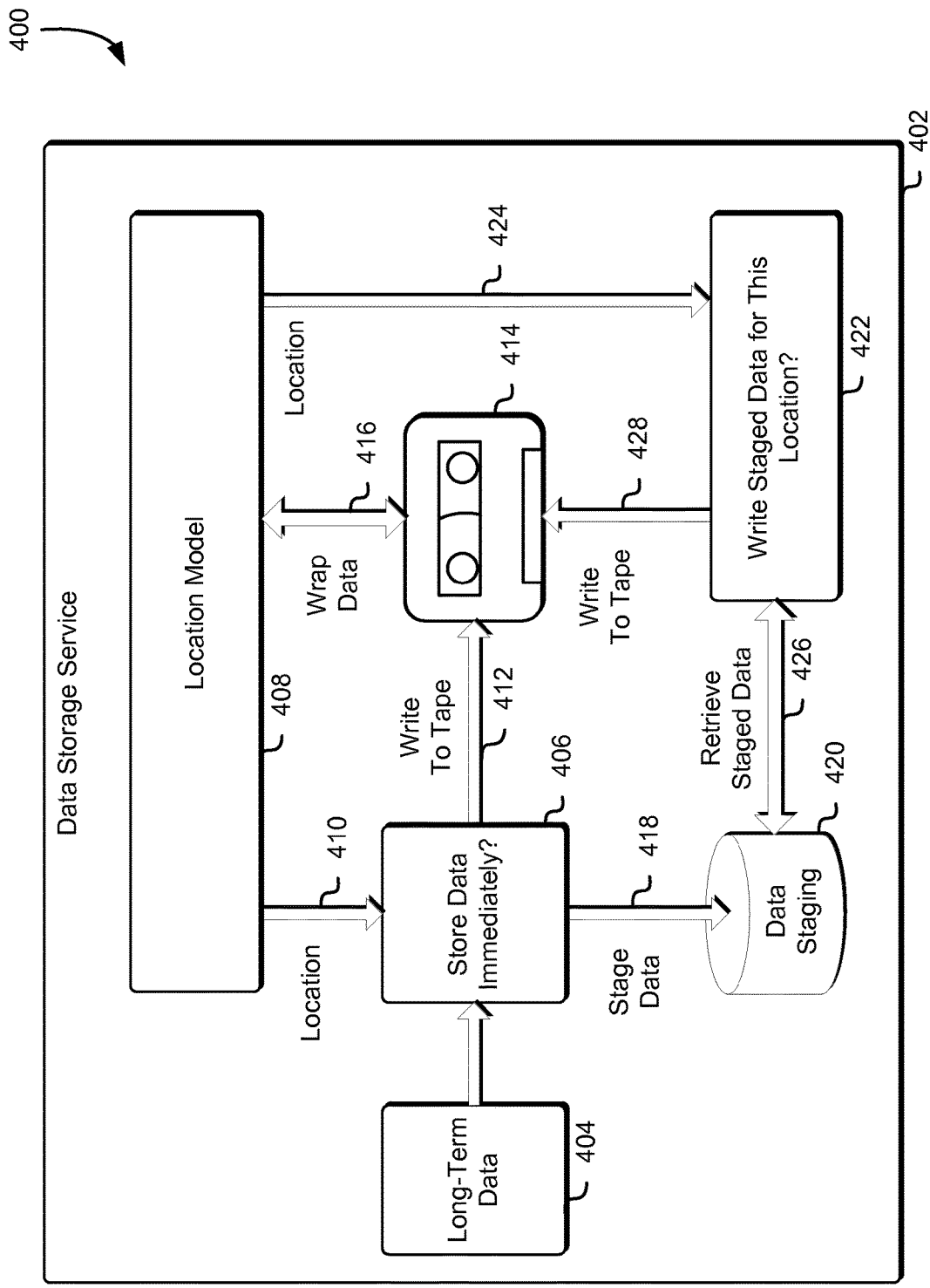
FIG. 4 illustrates an example environment where a location model may be generated for data stored on magnetic tape using a heterogeneous data storage technique.

FIG. 4 illustrates an example environment 400 where a location model may be generated for data stored on magnetic tape using a heterogeneous data storage technique as described in connection with FIG. 1 and in accordance with an embodiment. In the example illustrated in FIG. 4, long-term data 404, which may be the same as the long-term data 112 described in connection with FIG. 1, may be received for storage in long-term storage by a data storage service 402.

When the long-term data 404 is received, it may first be determined whether the data could be stored immediately 406 based on a current location 410 received from the location model 408 as described herein. This current location 410, which may also be referred to herein more simply as a "location" may be an estimated location or an approximate location based on the accuracy of the location model. Using the location model described in FIGS. 2 and 3, if the current location 410 from the location model 408 indicated that the tape 414 used for storage of the data was in the first partition, then data in the first data set may be stored immediately while data in, for example, the second data set may not be stored immediately. Data that may be stored immediately 406 may be written to tape 412. Conversely, data that may not be stored immediately 406 may be staged 418 in a data staging area 420 for storage when the tape 414 used for storage of the data is in the correct partition based on the location model 408.

As data is written to tape 412, the data transfer rate may be monitored and the monitored data transfer rate of the data may be used to generate the wrap data 416 for the tape 414. Furthermore, the wrap data 416 for the tape 414 may be used to update the location model 408. For example, a location model 408 for a tape 414 may be based at least in part on a plurality of previous tapes of the same type and may be based at least in part on a plurality of previous tape operations using the same type and/or instance of tape drive where the tape 414 is mounted. The location model 408 may indicate a current location 424 based on, for example, each partition being eight megabytes long (i.e., that the first partition is from zero megabytes of data sent to the tape to eight megabytes of data sent to the tape as measured from the BOT, the second partition is from eight megabytes of data sent to the tape to sixteen megabytes of data sent to the same as measured from the BOT, and so on) based on a location model where 128 MB of data can be sent to the tape as the tape spools from BOT to EOT and there are sixteen logical partitions.

However, as data is written to tape 412, the monitoring of the data transfer rate may indicate that data transfer rate drops at, for example, 136 megabytes from the BOT rather than at 128 megabytes from the BOT. This change in the data transfer rate may indicate that the wrap is at a different location than previously determined. In such an example, each logical partition may be changed to eight-and-half megabytes long (rather than eight megabytes long), or the number of logical partitions may be increased (adding, for example, one more eight megabyte partition), or the last partition may simply be extended to sixteen megabytes (eight megabytes plus eight megabytes), or the variance from the location model may simply be ignored and the extra eight megabytes not considered within the location model. In an embodiment, such a variance from the expected location model for the tape type and drive can cause the data storage service to generate an alert to have the drive and/or the tape checked for errors. In an embodiment, the logical partitions are all the same size (e.g., eight megabytes) and any new partitions are of that same size. In another embodiment, the partitions can be of different sizes, so that individual partitions can be adjusted based on updates to the location model.

The data storage service 402 may also use the current location 424 (which may be the same as the current location 410) from the location model 408 to determine whether data from the data staging area 420 may be written to the tape 428 as the tape spools. Using the example described above, the data for the second data set was not stored immediately when received because the tape was in the first partition and was instead stored in the data staging area 420. However, when the tape advances to the second partition the data for the second data set can be retrieved 426 from the data staging area 420 and written to the tape 428. This candidate data set that is selected for writing when the tape advances may be selected from a plurality of possible data sets if, for example, there are several data sets that may be written to that location. As the tape is spooled from the BOT to the EOT (or from the EOT to the BOT), the data storage service may continue to stage the data and write staged data for the location 422, based on the current location 424 from the location model 408.

Figure 5:
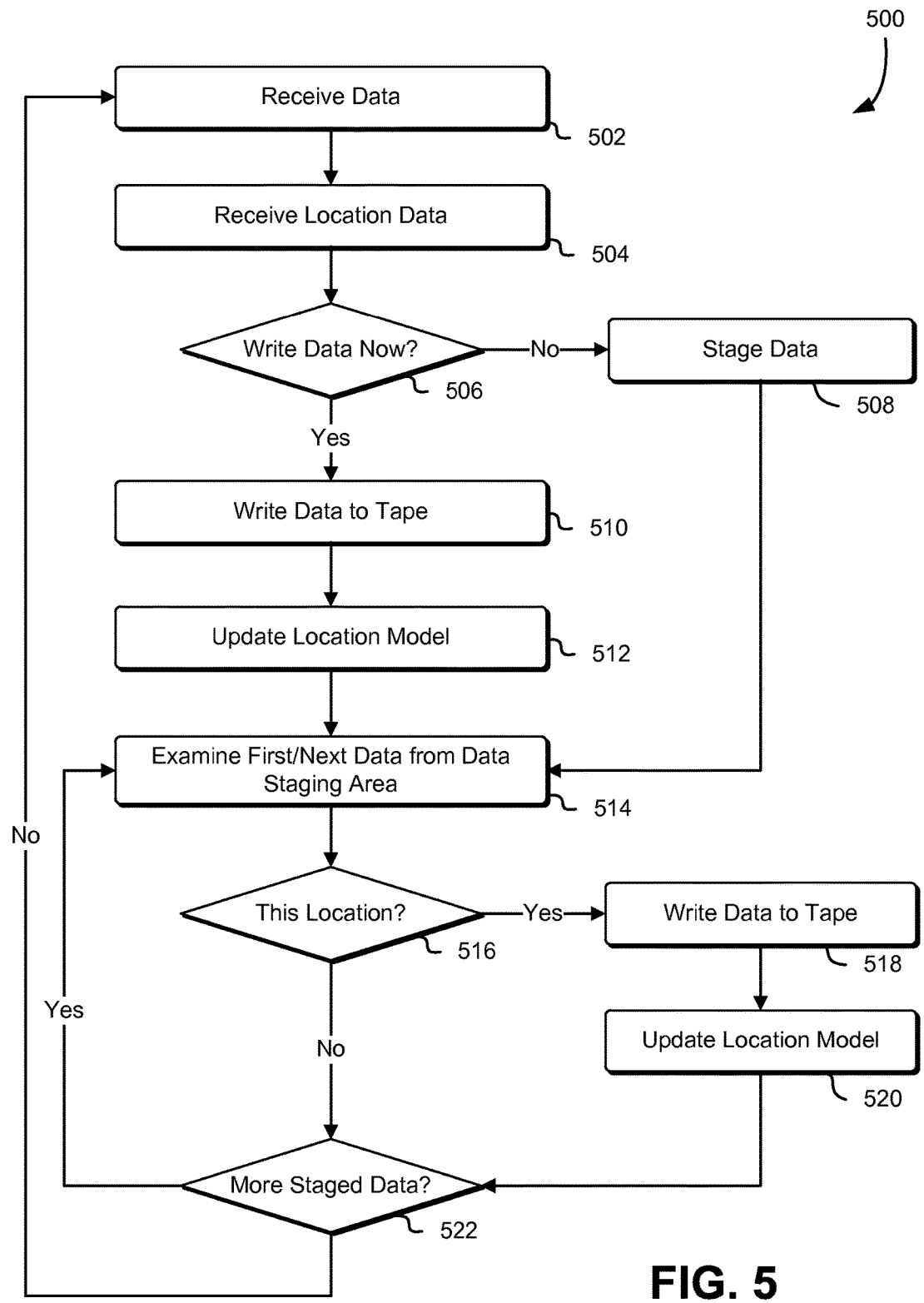
FIG. 5 illustrates an example process for storing data and updating a location model for data stored on magnetic tape using a heterogeneous data storage technique.

FIG. 5 illustrates an example process 500 for storing data and updating a location model for data stored on magnetic tape using a heterogeneous data storage technique as described in connection with FIG. 1 and in accordance with an embodiment. A data storage service such as the data storage service 402 described in connection with FIG. 4 may perform the process illustrated in FIG. 5. The data storage service may first receive 502 the data for storage and may receive current location data 504 from the location model as described above. The data storage service may then determine 506 whether to write the data now. As described herein, the data storage service may use the current location data to determine whether the data received should be written to the tape at the present time, or whether the data should be stored in a data cache such as the data staging area 420 described in connection with FIG. 4.

If the data storage service does determine 506 that the received data should not be written to the tape because, for example, the tape is spooled to a logical partition other than the partition where the received data should be stored, the data storage service may stage 508 the received data for later storage as described below. If the data storage service does determine 506 that the received data should be written to the tape because, for example, the tape is spooled to a logical partition where the received data should be stored, the data storage service may write 510 the data to the tape. The data storage service may monitor the operations to write 510 the data to the tape and may use results from monitoring such operations to update 512 the location model as described below.

In the second part of the example process 500 illustrated in FIG. 5, the data storage may begin processing the data stored in the data staging area by examining the first set of data stored in the data staging area 514. The data storage service may then determine 516 whether the set of examined data should be written to the tape at the present location (i.e., the current location), based on the location data or whether the examined data should remain in the data staging area. If the data storage service does determine 516 that the received data should be written to the tape because, for example, the tape is spooled to a logical partition where the examined data should be stored, the data storage service may write 518 the examined data to the tape and update 520 the location model also as described below. The data storage may finally determine 522 whether there is more staged data to be examined and, if so, may examine the next set of data stored in the data staging area 514. If the data storage service does not determine 522 that there is more staged data to be examined (e.g., for the present location), the data storage service may wait for the next set of received data.

In an embodiment, the data storage service monitors the operations to write 510 the data to the tape and/or monitors the operations to write 518 the data to tape to determine the data transfer rate and, when the data transfer rate drops below a determined data transfer threshold, uses the lowered data transfer rate to update the location model with a potential tape wrap. The potential tape wrap may be used to update 512 the location model and/or update 520 the location model by determining the time for the potential tape wrap, the data transfer rate or amount of the potential tape wrap, and/or the location of the potential tape wrap.

For example, if the tape maintains a steady data transfer rate during data writes, and that data transfer rate drops below a data transfer threshold, the location model may be updated with a tape wrap, and in the context of previous tape wraps, the location model may determine whether the wrap is at the BOT, at the EOT, or is a result of some other event such as, for example, a tape error. The logical partitions of the location model may also be updated based at least in part on the context of previous tape wraps. For example, if a BOT has been previously identified, the next lowered transfer rate may indicate a corresponding EOT. Taking the difference between the BOT and the EOT, a heuristic model for the logical extent of the tape (e.g., in terms of time, data, physical length, and/or a combination of these, as described above) may be generated. Subsequent wraps may then be used to update this heuristic model for the logical extent of the tape using, for example, an average, or a weighted average, or an error-corrected average (e.g., by discarding outlier values), or using some other data analysis methodology.

In an embodiment, the first part of the process 500 illustrated in FIG. 5 (e.g., the steps to receive 502 the data, to receive current location data 504, to determine 506 whether to write the data, to stage 508 the received data, to write 510 the data to the tape, and to update 512 the location model) is performed separately from the second part of the process 500 illustrated in FIG. 5 (e.g., the steps to examine the data stored in the data staging area 514, to determine 516 whether the set of examined data should be written to the tape, to write 518 the examined data to the tape, to update 520 the location model, and to determine 522 whether more data from the data staging area should be examined). For example, the first part of the process 500 may be performed whenever data is received and the second part of the process 500 may be performed whenever a new logical partition of the tape is reached. In another example, the second part of the process 500 may be performed constantly using, for example, a separate process or thread operating in conjunction with the data storage service. In an embodiment, the data storage service spawns multiple processes or threads to monitor data storage for data written to a plurality of tapes and to update one or more corresponding location models.

Figure 6:
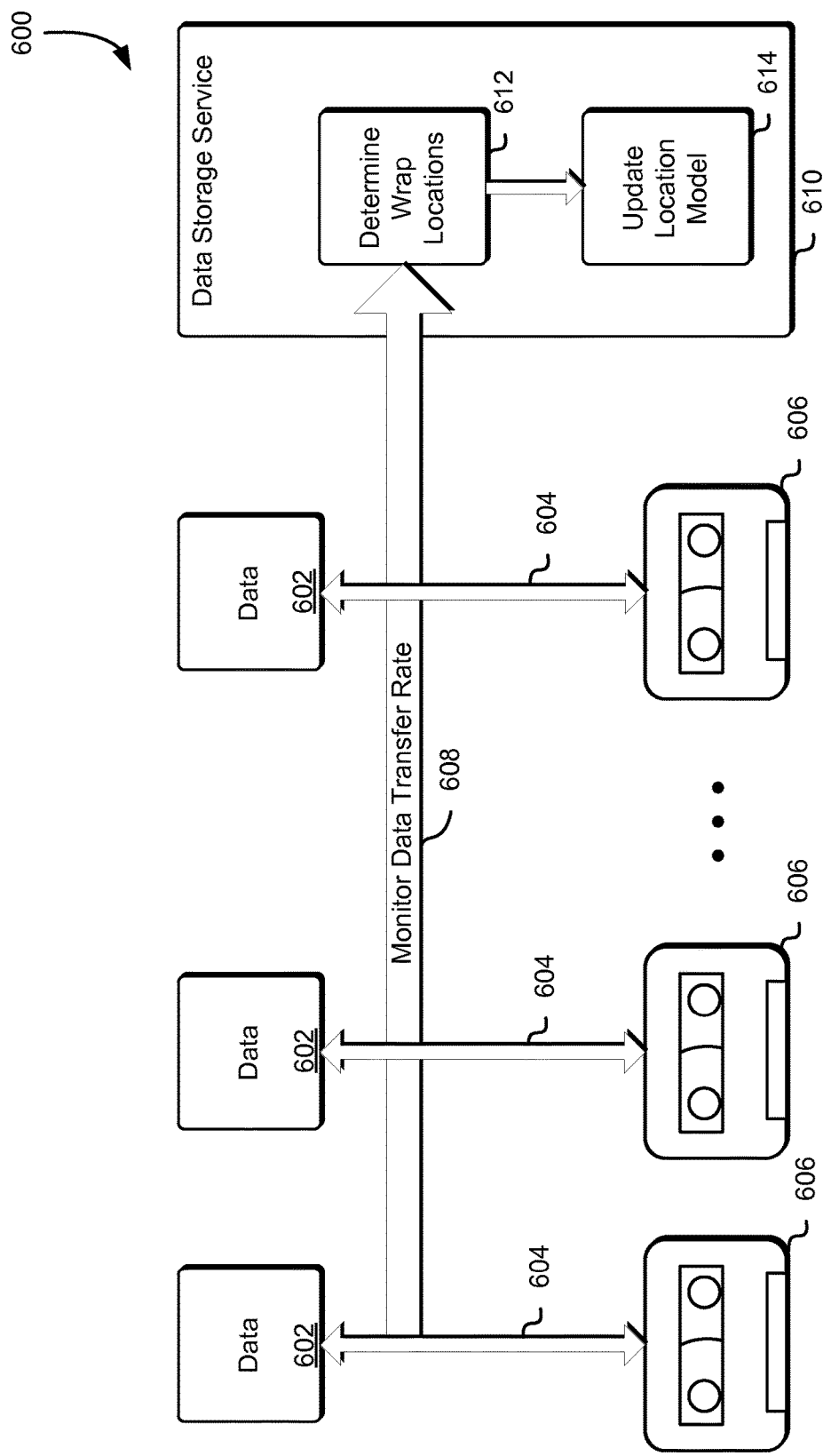
FIG. 6 illustrates an example environment where data transfer rates may be collected and used to update a location model for data stored on magnetic tape using a heterogeneous data storage technique.

FIG. 6 illustrates an example environment 600 where data transfer rates may be collected and used to update a location model for data stored on magnetic tape using a heterogeneous data storage technique as described in connection with FIG. 1 and in accordance with an embodiment. In the example illustrated in FIG. 6, one or more data sets 602 may be written 604 to one or more tapes 606. In an embodiment, the data writes (i.e., the storage of data on the tape) are monitored 608 to detect changes in the data transfer rate and to determine potential tape wraps as described herein. In another embodiment, the data reads (i.e., the retrieval of data from the tape) are monitored 608 to detect changes in the data transfer rate and to determine potential tape wraps. In another embodiment, both the data writes and the data reads are monitored 608 to detect changes in the data transfer rate and to determine potential tape wraps.

Based at least in part on the detected changes in the data transfer rates, the data storage service 610 may determine 612 which of the potential wraps are actual wraps and may update 614 the location model accordingly. For example, a data storage service may detect slowdowns in the data transfer rate for a particular tape and tape drive after 128 megabytes have been sent to the tape, after 257 megabytes have been sent to the tape, after 385 megabytes have been sent to the tape, after 512 megabytes have been sent to the tape, and after 640 megabytes have been sent to the tape. From this set of data slowdowns, the location model may generate a location where the time difference between the BOT and the EOT is 128 megabytes of data sent to the tape and may generate a partition model accordingly. However, if the next data slowdown occurs after 700 megabytes have been sent to the tape, followed by another slowdown after 780 megabytes have been sent to the tape, the data storage service 610 may determine that the data slowdown at 700 megabytes is not a valid wrap and should not be used to update the location model. Additionally, the data slowdown after 780 megabytes, with a BOT to EOT data transfer of 140 megabytes (from the previous valid wrap of 640 megabytes) may also not be used to update the location model even though it is probably a valid wrap, because it is an outlier as compared to the other data used to generate the location model. Conversely, if many subsequent slowdowns occur at 140 megabyte intervals, the location model may be updated to reflect this preponderance of new data.

In the example illustrated in FIG. 6, the data transfer rate from a plurality of data writes and/or data reads may be monitored to update the location model. In an embodiment, the data transfer rate from the plurality of data writes and/or data reads are monitored by the data storage service 610. In another embodiment, the data transfer rate from the plurality of data writes and/or data reads are monitored by the computer system, application, or service that generates the data for storage and provided to the data storage service 610. In another embodiment, the data transfer rate from the plurality of data writes and/or data reads are monitored by the tape drives and provided to the data storage service 610. The data storage service 610 may use the data transfer rate from the plurality of data writes and/or data reads to generate one or more location models as described above. For example, the data storage service 610 may generate a data storage model for each tape drive type, or for each tape drive (i.e., for each particular drive), or for each tape type (e.g., for tapes from different vendors, of different lengths, of different data capacities, of different generations), for each combination of tape drive type and tape type, for each individual tape, or for combinations of these and/or other different categories.

Figure 7:
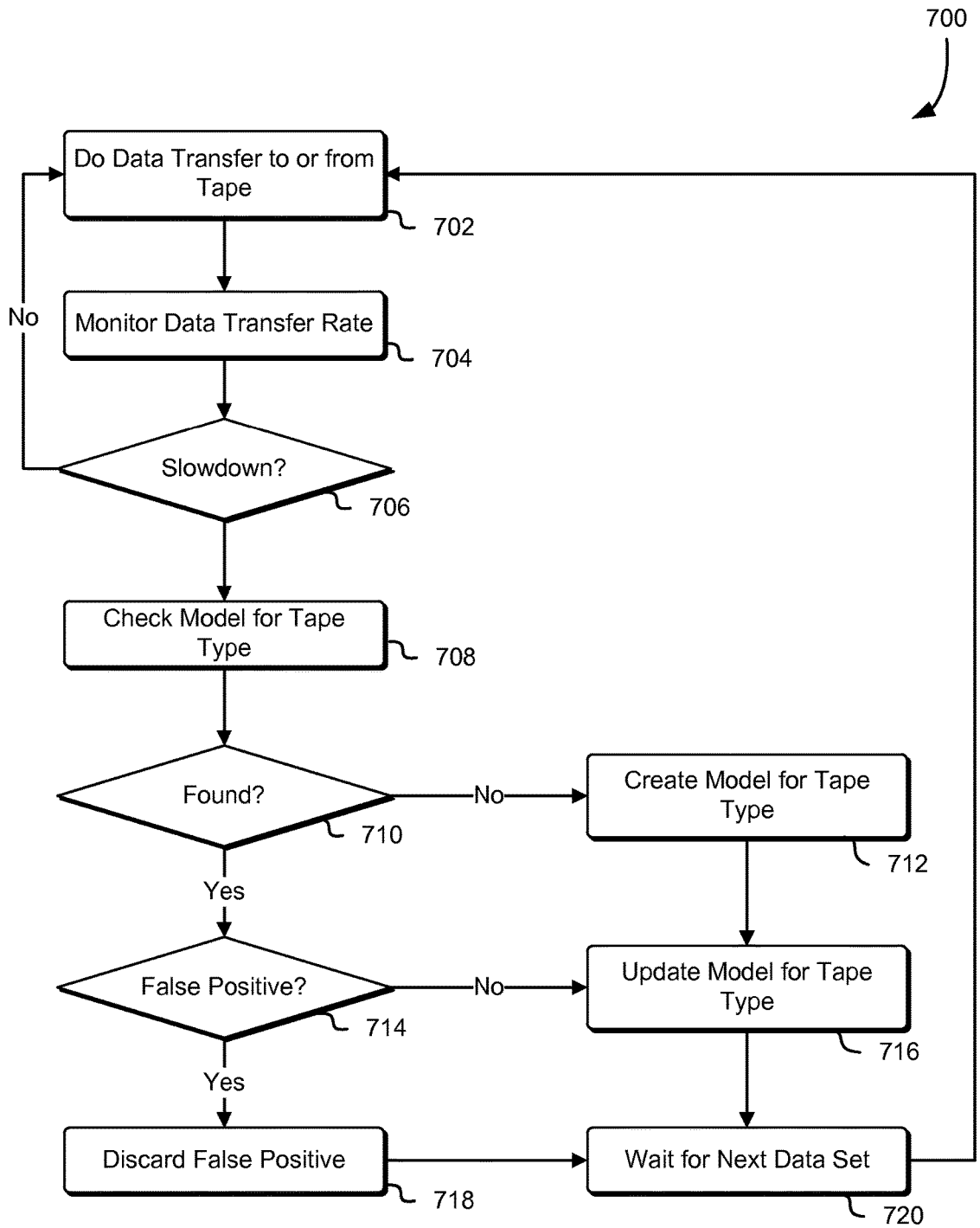
FIG. 7 illustrates an example process for identifying tape wraps for magnetic tape using data transfer rates for data stored on magnetic tape using a heterogeneous data storage technique.

FIG. 7 illustrates an example process 700 for identifying tape wraps for magnetic tapes using data transfer rates for data stored on tape using a heterogeneous data storage technique as described in connection with FIG. 1 and in accordance with an embodiment. A data storage service such as the data storage service 402 described in connection with FIG. 4 may perform the process illustrated in FIG. 7. The data storage service may do a data transfer 702 to or from a tape (e.g., a write to the tape). The data storage service may next monitor 704 the data transfer to detect changes in the data transfer rate. For example, if data is generally written to the tape at 1.5 GB per second, and the data transfer rate falls below a data transfer threshold, then a change in the data transfer rate may be detected by the data storage service. In an embodiment, the data transfer threshold is a percentage of the general data transfer rate (e.g., 10%). In such an embodiment, and using the example illustrated, a change in the data transfer rate may be detected when the data transfer rate falls below 150 MB per second. In another embodiment, the data transfer threshold is an absolute value (e.g., 100 MB per second) and a change in the data transfer rate may be detected when the data transfer rate falls below this data transfer threshold. In another embodiment, different data transfer threshold values are used for different operations so that, for example, the data transfer threshold used to detect changes in the data transfer rate is 100 MB per second for write operations and 200 MB per second for read operations.

If a slowdown 706 is detected (i.e., if a change in the data transfer rate falls below the threshold value), the may use the detected slowdown to update one or more location models as described above. First, the data storage service may determine 708 whether there is a location model for the tape type and/or drive type that experienced the slowdown. If a model is found 710, the data storage service then determines 714 whether the slowdown is a false positive tape wrap. False positive tape wraps may occur as a result of an error in the tape write or an error in data transfer from the source. False positive tape wraps may be detected based on previous slowdowns associated with the tape type and/or drive type that experienced the slowdown.

For example, if a location model for the tape type and/or the drive type has a large number of previous slowdowns that conform to a standard value (i.e., there is a high confidence associated with the location model and/or the standard deviation of the values is very low), then any value that varies very significantly from that location model may be determined to be a false positive tape wrap. Conversely, if the location model for the tape type and/or the drive type has only a small number of previous slowdowns, or there is a low confidence associated with the location model, or the standard deviation is high, then more variations in the slowdowns may have to be accepted and used to update the model.

If the data storage service determines 714 that the slowdown is a false positive tape wrap, the false positive tape wrap may be discarded 718 and the data storage service may wait 720 for the next data set. If the data storage service determines that the slowdown is not a false positive tape wrap, the data storage service may update 716 the location model for the tape type and/or the drive type and then may also wait 720 for the next data set. It should be noted that if a model is not found 710 for the tape type and/or the drive type, a new model may be created 712 for the tape type and/or the drive type and the model may be updated with the detected slowdown. In the event that a new model is created 712 for the tape type and/or drive type, the new model may have a low associated confidence until more slowdowns are detected for that tape type and/or drive type.

Figure 8:
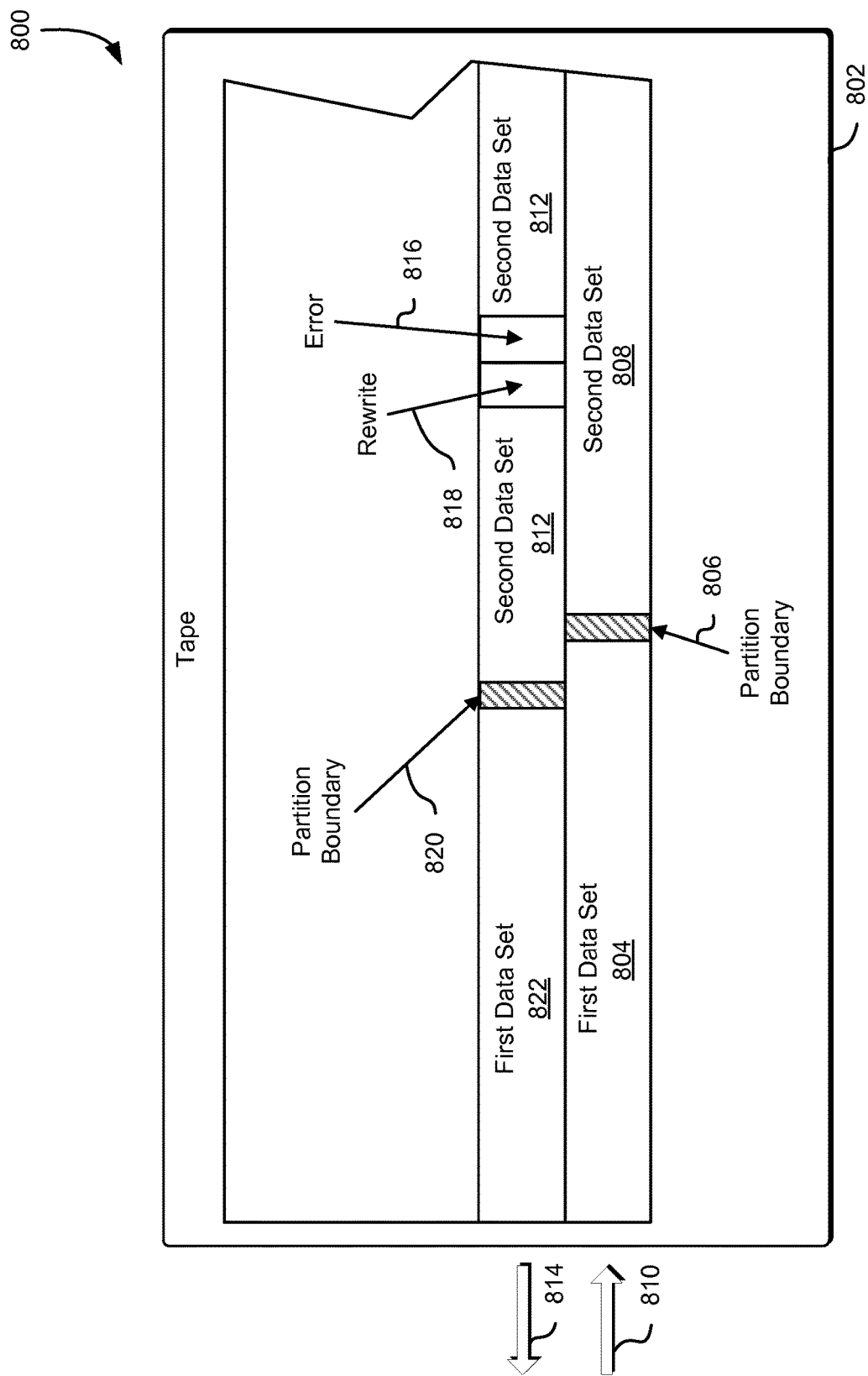
FIG. 8 illustrates an example environment where data errors may influence partition boundaries for data stored on magnetic tape using a heterogeneous data storage technique.

FIG. 8 illustrates an example diagram 800 of how data errors may influence logical partition boundaries for data stored on magnetic tape using a heterogeneous data storage technique as described in connection with FIG. 1 and in accordance with an embodiment. In the example illustrated in FIG. 8, data is stored on a tape 802 with a first data set 804 in a first partition and a second data set 808 in a second data partition as the tape is spooled in a first direction 810 (e.g., from the BOT to the EOT). The partition boundary 806 between the first data set 804 and the second data set 808 is a logical boundary (rather than a physical boundary) that represents the tape movement that may occur after the data storage service stops writing data to the first logical partition, but before the data storage service starts writing data to the second logical partition. In an embodiment, the partition boundary 806 is a logical partition boundary and represents a portion of the tape that is not part of any logical partition.

When the tape is spooled in the second direction 814 (e.g., from the EOT to the BOT) an error may occur in writing the second data set 812. Generally, when data is written to a magnetic tape, a trailing read head (i.e., a tape head configured to read data from the tape) reads the data that was previously written by the write head and uses the read back data to detect errors in the data that was written. In the event that an error 816 is detected because of, for example, the failure of a data checksum, the erroneous data is rewritten 818 to the tape. This process is built in to the tape drive itself, and requires no interaction with the data storage service and/or the service that generates the data. However, because of the rewritten data, the partition 820 between the second data set 812 and the first data set 822 may be shifted relative to the partition boundary 806 between the first data set 804 and the second data set 808. In order to maintain the logical partition boundaries, the data storage service may intentionally place a file marker between logical partitions, and may, for example, mark the start of the data write to the second partition after completing the data write to the first partition so that the logical partitions may be accurately located when reading data back from the tape.

Figure 9:
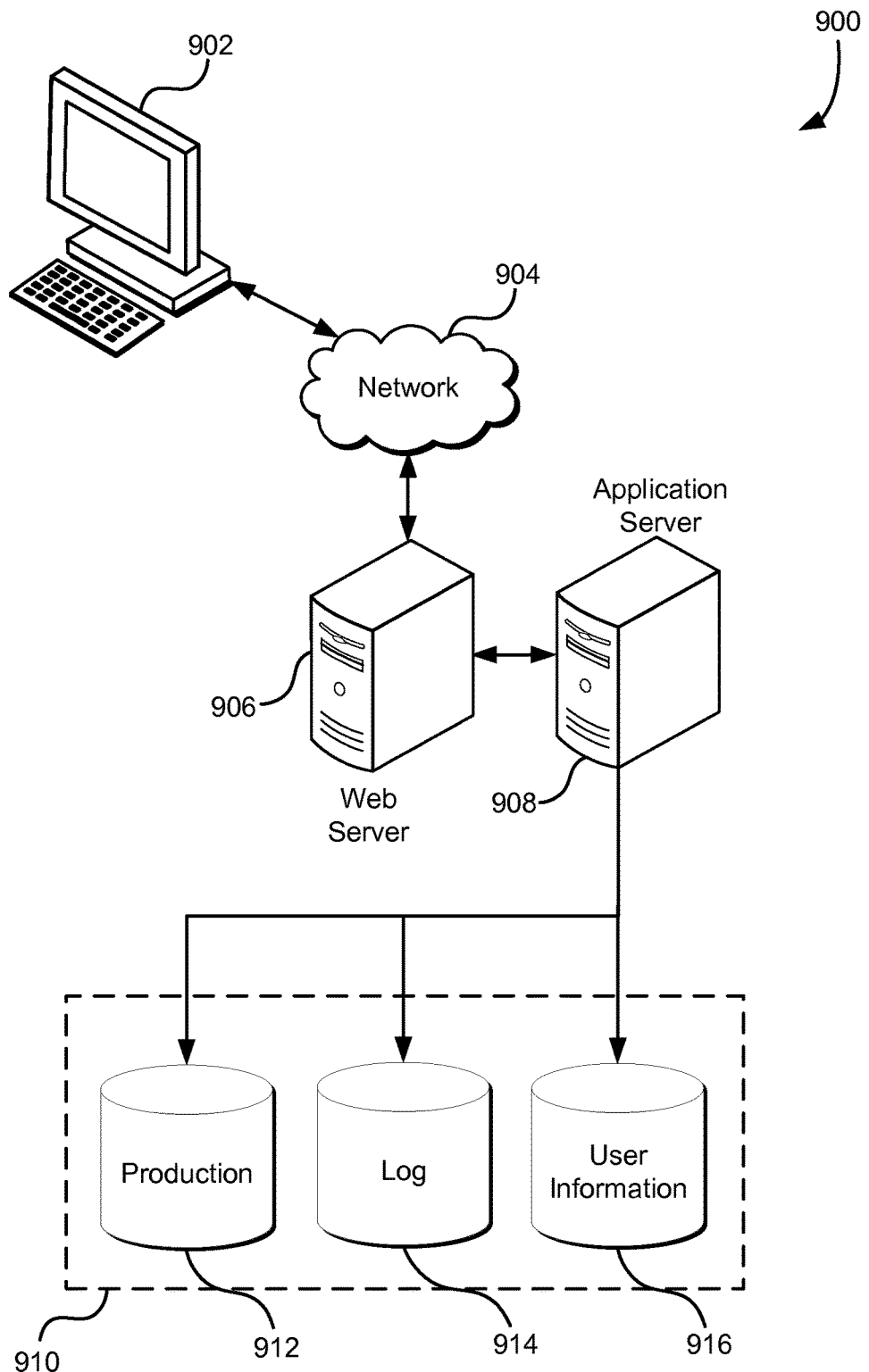
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment.

The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of Hyper-Text Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for storing data on a magnetic tape using a magnetic tape drive, comprising:
    under the control of one or more computer systems configured with executable instructions,
    receiving a first set of data for storage on the magnetic tape using the magnetic tape drive;
    determining a first logical partition for the first set of data, the first logical partition selected from a plurality of logical partitions specified by a logical model of the magnetic tape;
    determining a current location of a tape head of the magnetic tape drive in reference to the magnetic tape, the current location based at least in part on the logical model of the magnetic tape;
    writing the first set of data to the magnetic tape if the current location corresponds to the first logical partition;
    storing the first set of data in a data staging area if the current location does not correspond to the first logical partition;
    selecting a second set of data from the data staging area based at least in part on a second logical partition associated with the second set of data corresponding to the current location;
    writing the second set of data to the magnetic tape; and
    updating the logical model.

2. The computer-implemented method of claim 1, wherein:
    the logical model is based at least in part on an amount of data that can be stored on the magnetic tape; and
    each logical partition of the plurality of logical partitions has a corresponding amount of data, each corresponding amount of data including a portion of the amount of data that can be stored on the magnetic tape.

3. The computer-implemented method of claim 2, wherein
    updating the logical model comprises:
    monitoring a data transfer rate associated with writing the first set of data to the magnetic tape and writing the second set of data to the magnetic tape; and
    as a result of detecting that the data transfer rate is less than a data transfer threshold value, at least:
    calculating a new amount of data that can be stored on the magnetic tape per pass;
    validating the new amount of data that can be stored on the magnetic tape per pass based at least in part on the logical model;
    updating the amount of data that can be stored on magnetic tape per pass to produce an updated amount of data that can be stored on magnetic tape per pass; and
    updating the corresponding amount of data of one or more of the plurality of logical partitions based at least in part on the updated amount of data that can be stored on magnetic tape per pass.

4. The computer-implemented method of claim 1, wherein each logical partition is disjoint from other logical partitions.

5. A system, comprising at least one processor configured to implement one or more services, wherein the one or more services are configured to:
    determine a logical partition for a set of data, the logical partition selected from a plurality of logical partitions specified by a logical model of a data storage tape, the logical model based at least in part on a logical extent of the data storage tape;
    estimate a current location of a data storage tape head in reference to the data storage tape, the data storage tape head being a tape head of a tape drive upon which the data storage tape is mounted;
    if the current location corresponds to the logical partition:
    perform a first data transfer operation to write the set of data to the data storage tape;
    monitor the first data transfer operation to determine a first data transfer rate;
    identify one or more changes in the first data transfer rate;
    update the logical extent of the data storage tape based at least in part on the one or more changes in the first data transfer rate to produce an updated logical extent of the data storage tape; and
    update the logical model based at least in part on the updated logical extent of the data storage tape; and
    if the current location does not correspond to the logical partition, store the set of data in a data staging area.

6. The system of claim 5, wherein the current location of the data storage tape head in reference to the data storage tape is estimated based at least in part on the first data transfer rate.

7. The system of claim 5, wherein the one or more services are further configured to:
    select a candidate data set from the data staging area, the candidate data set selected based at least in part on the candidate data set having a logical partition corresponding to the current location;
    perform a second data transfer operation to write the candidate data set to the data storage tape;
    monitor the second data transfer operation to determine a second data transfer rate;

identify one or more changes in the second data transfer rate;
update the logical extent of the data storage tape based at least in part on the one or more changes in the second data transfer rate; and
update the logical model based at least in part on the updated logical extent of the data storage tape.

8. The system of claim 7, wherein the current location of the data storage tape head in reference to the data storage tape is estimated based at least in part on the second data transfer rate.

9. The system of claim 5, wherein the current location of the data storage tape head in reference to the data storage tape is estimated based at least in part on a position query made to the tape drive.

10. The system of claim 5, wherein the logical extent of the data storage tape is determined based at least in part on a length of time sufficient to spool the data storage tape from a beginning of the tape to an end of the tape.

11. The system of claim 5, wherein the logical extent of the data storage tape is based at least in part on a length of the data storage tape.

12. The system of claim 5, wherein the logical extent of the data storage tape is based at least in part on an amount of data that can be stored on the data storage tape.

13. The system of claim 5, wherein each logical partition is based at least in part on a portion of the logical extent of the tape.

14. A non-transitory computer-readable storage medium having stored thereon executable instructions that, as a result of being executed by one or more processors of a computer system, cause the computer system to at least:
generate a plurality of logical partitions of a tape that each specify a corresponding portion of a logical extent of the tape, such that each logical partition is disjoint from other logical partitions;
determine an estimated current location of a tape head of a tape drive in reference to the tape, the tape drive being the tape drive where the tape is mounted;
select a set of data from a data staging area, the data set selected based at least in part on the data set having an associated logical partition corresponding to the estimated current location;
perform a data transfer operation to store the set of data on the tape;
monitor a data transfer rate of the data transfer operation;
update, based at least in part on the data transfer rate, the logical extent of the tape to produce an updated logical extent of the tape; and
update one more of the plurality of logical partitions of the tape based at least in part on the updated logical extent of the tape.

15. The non-transitory computer-readable storage medium of claim 14, wherein each tape type of a set of tape types has a corresponding logical model.

16. The non-transitory computer-readable storage medium of claim 14, wherein each tape drive of a set of tape drives has a corresponding logical model.

17. The non-transitory computer-readable storage medium of claim 14, wherein the instructions that cause the computer system to update the logical extent of the tape further include instructions that cause the computer system to:
identify a tape wrap based at least in part on the data transfer rate falling below a data transfer threshold;
determine a new logical extent of the tape by comparing the tape wrap to previous tape wraps; and
update the logical extent of the tape based at least in part on the new logical extent.

18. The non-transitory computer-readable storage medium of claim 17, wherein the instructions that cause the computer system to identify a tape wrap further include instructions that cause the computer system to discard false positive tape wraps based at least in part comparing the tape wrap to previous tape wraps.

19. The non-transitory computer-readable storage medium of claim 17, wherein the instructions further comprise instructions that, as a result of being executed by the one or more processors, cause the computer system to:
store the estimated current location corresponding to the tape wrap in a logical model of the tape; and
store the updated logical extent of the tape corresponding to the tape wrap in a logical model of the tape.

20. The non-transitory computer-readable storage medium of claim 14, wherein between each pair of logical partitions, there is at least one partition boundary comprising a portion of the logical extent not a part of any logical partition.

* * * * *